United States Patent
Togano et al.

(10) Patent No.: US 11,346,589 B2
(45) Date of Patent: May 31, 2022

(54) REFRIGERATION MACHINE CONTROL DEVICE, TURBO REFRIGERATION MACHINE, REFRIGERATION MACHINE CONTROL METHOD, AND PROGRAM

(71) Applicant: MITSUBISHI HEAVY INDUSTRIES THERMAL SYSTEMS, LTD., Tokyo (JP)

(72) Inventors: Yoshie Togano, Tokyo (JP); Yasushi Hasegawa, Tokyo (JP); Ryosuke Suemitsu, Tokyo (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 207 days.

(21) Appl. No.: 16/498,953

(22) PCT Filed: Mar. 8, 2018

(86) PCT No.: PCT/JP2018/008983
§ 371 (c)(1),
(2) Date: Sep. 27, 2019

(87) PCT Pub. No.: WO2018/180337
PCT Pub. Date: Oct. 4, 2018

(65) Prior Publication Data
US 2021/0108843 A1  Apr. 15, 2021

(30) Foreign Application Priority Data
Mar. 31, 2017 (JP) .............................. JP2017-070049

(51) Int. Cl.
*F25B 49/02* (2006.01)
*F25B 1/053* (2006.01)

(52) U.S. Cl.
CPC .............. *F25B 49/02* (2013.01); *F25B 1/053* (2013.01); *F25B 2339/047* (2013.01);
(Continued)

(58) Field of Classification Search
CPC .... F25B 49/02; F25B 1/053; F25B 2339/047; F25B 2500/16; F25B 2600/2513;
(Continued)

(56) References Cited

U.S. PATENT DOCUMENTS

2002/0134103 A1* 9/2002 Nishii ....................... F04F 5/10
62/500

FOREIGN PATENT DOCUMENTS

JP   H06173858 A  *  6/1994
JP   2009-186030 A     8/2009

OTHER PUBLICATIONS

Oka, Turbo Compressor, Jun. 21, 1994, JPH06173858A, Whole Document (Year: 1994).*

(Continued)

*Primary Examiner* — Larry L Furdge
(74) *Attorney, Agent, or Firm* — Birch, Stewart, Kolasch & Birch, LLP.

(57) ABSTRACT

A refrigeration machine control device according to an embodiment of the present invention serves to control a turbo refrigeration machine and is equipped with a pressure reduction rate identification unit for identifying a pressure reduction rate at which foaming does not occur in an oil tank, and a pressure adjustment unit for adjusting the pressure of an evaporator on the basis of the identified pressure reduction rate. The pressure reduction rate identification unit is equipped with: a refrigerant precipitation gas volume calculation unit for calculating the volume of refrigerant gas precipitated from lubricating oil when the pressure is reduced at a prescribed pressure reduction rate; and a (Continued)

determination unit for determining whether or not foaming is permissible on the basis of a comparison between the calculated volume and the volume on the surface of the oil in the oil tank.

5 Claims, 6 Drawing Sheets

(52) U.S. Cl.
CPC ... *F25B 2500/16* (2013.01); *F25B 2600/2513* (2013.01); *F25B 2700/1352* (2013.01); *F25B 2700/2105* (2013.01); *F25B 2700/21172* (2013.01); *F25B 2700/21173* (2013.01)

(58) Field of Classification Search
CPC ...... F25B 2700/1352; F25B 2700/2105; F25B 2700/21172; F25B 2700/21173; F04D 27/00; F04D 29/063
See application file for complete search history.

(56) References Cited

OTHER PUBLICATIONS

International Search Report for International Application No. PCT/JP2018/008983, dated Jun. 5, 2018, with an English translation.
Written Opinion of the International Searching Authority for International Application No. PCT/JP2018/008983, dated Jun. 5, 2018, with an English translation.

\* cited by examiner

REFRIGERATION MACHINE CONTROL DEVICE, TURBO REFRIGERATION MACHINE, REFRIGERATION MACHINE CONTROL METHOD, AND PROGRAM

TECHNICAL FIELD

The present invention relates to a refrigeration machine control device, a turbo refrigeration machine, a refrigeration machine control method, and a program.

Priority is claimed on Japanese Patent Application No. 2017-070049, filed Mar. 31, 2017, the content of which is incorporated herein by reference.

BACKGROUND ART

Conventionally, HFC (alternative chlorofluorocarbon) refrigerants used in turbo refrigeration machines have a GWP (Global Warming Potential) of several hundreds to several thousands, and it is necessary to replace them with HFO refrigerants with a single-digit GWP in consideration of the environment. In order to cope with this, a low-pressure refrigerant such as HFO-1233zd (E) having no combustibility may be used as a chiller refrigerant. A turbo refrigeration machine generally includes an oil tank in which lubricating oil to be supplied to a turbo compressor is stored. Here, a specific volume of FO-1233zd (E) refrigerant gas is about five times that of HFC-134a. Therefore, in a refrigeration machine using this low-pressure refrigerant, a volume of a gas increases when a pressure in the oil tank becomes equal to or lower than atmospheric pressure. That is, in a refrigeration machine using a low-pressure refrigerant, when the same mass of refrigerant as that which has dissolved in the lubricating oil in the oil tank evaporates due to a pressure drop, the volume of the evaporating refrigerant increases, and foaming is likely to occur in the lubricating oil in the oil tank in contrast to a refrigeration machine using a high-pressure refrigerant. In particular, at the time of startup in which a pressure reduction rate on the lower pressure side is large, foaming tends to occur in the lubricating oil in the oil tank.

Patent Document 1 discloses a technique in which, when a turbo compressor is started, startup is performed with an opening degree of a suction capacity control unit smaller than a target opening degree, and then it is rapidly opened to the target opening degree, and the operation time during being below the target opening degree is reduced as far as possible to reduce the passage resistance of the refrigerant, and thus occurrence of foaming is curbed by curbing a pressure drop on the downstream side of the suction capacity control unit.

However, since the amount of refrigerant dissolved in the lubricating oil differs according to a value of the pressure even with the same pressure drop rate, an elution amount of the refrigerant from the lubricating oil varies according to the pressure in the oil tank. Further, the amount of refrigerant dissolved in the lubricating oil also depends on the temperature. Therefore, it is required to more reliably curb foaming in the oil tank.

CITATION LIST

Patent Literature

Patent Document 1

Japanese Unexamined Patent Application, First Publication No. 2009-186030

SUMMARY OF INVENTION

Technical Problem

An object of the present invention is to provide a refrigeration machine control device, a turbo refrigeration machine, a refrigeration machine control method, and a program which are able to more reliably curb foaming in an oil tank.

Solution to Problem

According to a first aspect of the present invention, there is provided a refrigeration machine control device which is configured to control a turbo refrigeration machine and includes a turbo compressor which is configured to compress a refrigerant gas, a condenser which is configured to condense the refrigerant gas compressed by the turbo compressor by heat being radiated through heat exchange, an expansion valve which is configured to expand a liquid refrigerant guided from the condenser, an evaporator which is configured to lower a temperature of chilled water flowing in from a chilled water inlet by causing the liquid refrigerant expanded by the expansion valve to absorb heat and to evaporate due to heat exchange and then cause the chilled water to flow out from a chilled water outlet, an oil tank which stores lubricating oil to be supplied to the turbo compressor, and a pressure equalizing pipe which connects the oil tank to the evaporator, including a pressure reduction rate identification unit which is configured to identify a pressure reduction rate at which foaming does not occur in the oil tank, and a pressure adjustment unit which is configured to adjust a pressure of the evaporator on the basis of the identified pressure reduction rate, wherein the pressure reduction rate identification unit includes a refrigerant precipitation gas volume calculation unit which is configured to calculate a volume of a refrigerant gas precipitated from the lubricating oil when the pressure is reduced at a predetermined pressure reduction rate, and a determination unit which is configured to determine whether or not the foaming is permissible on the basis of a comparison between the calculated volume and a volume on a surface of an oil in the oil tank.

According to a second aspect of the present invention, the refrigeration machine control device may further include a chilled water outlet temperature setting unit which is configured to calculate an amount of decrease in an evaporation temperature according to the identified pressure reduction rate and sets a value obtained by subtracting the amount of decrease in the evaporation temperature from a set chilled water outlet temperature, which is a current target value of a temperature of the chilled water outlet, as a new set chilled water outlet temperature, and the pressure adjustment unit may adjust the pressure of the evaporator so that a measured value of the temperature of the chilled water outlet matches a set chilled water outlet temperature set by the chilled water outlet temperature setting unit.

According to a third aspect of the present invention, there is provided a turbo refrigeration machine including a turbo compressor which is configured to compress a refrigerant gas, a condenser which is configured to condense the refrigerant gas compressed by the turbo compressor, an expansion valve which is configured to expand a liquid refrigerant guided from the condenser, an evaporator which is configured to lower a temperature of chilled water flowing in from a chilled water inlet by evaporating the liquid refrigerant expanded by the expansion valve and then cause the chilled water to flow out from a chilled water outlet, an oil tank which stores lubricating oil to be supplied to the turbo compressor, a pressure equalizing pipe which connects the oil tank to the evaporator, and a refrigeration machine control device which is configured to control each of the parts, wherein the refrigeration machine control device includes a pressure reduction rate identification unit which is configured to identify a pressure reduction rate at which foaming does not occur in the oil tank, and a pressure adjustment unit which is configured to adjust a pressure of the evaporator on the basis of the identified pressure reduction rate, and wherein the pressure reduction rate identification unit includes a refrigerant precipitation gas volume calculation unit which is configured to calculate a volume of a refrigerant gas precipitated from the lubricating oil when the pressure is reduced at a predetermined pressure reduction rate, and a determination unit which is configured to determine whether or not the foaming is permissible on the basis of a comparison between the calculated volume and a volume on a surface of an oil in the oil tank.

According to a fourth aspect of the present invention, there is provided a refrigeration machine control method in which a turbo refrigeration machine including a turbo compressor which is configured to compress a refrigerant gas, a condenser which is configured to condense the refrigerant gas compressed by the turbo compressor by radiating heat through heat exchange, an expansion valve which is configured to expand a liquid refrigerant guided from the condenser, an evaporator which is configured to lower a temperature of chilled water flowing in from a chilled water inlet by causing the liquid refrigerant expanded by the expansion valve to absorb heat and to evaporate due to heat exchange and then cause the chilled water to flow out from a chilled water outlet, an oil tank which stores lubricating oil to be supplied to the turbo compressor, and a pressure equalizing pipe which connects the oil tank to the evaporator is controlled by a refrigeration machine control device, wherein the refrigeration machine control device includes a pressure reduction rate identification unit which is configured to identify a pressure reduction rate at which foaming does not occur in the oil tank, wherein a pressure adjustment unit which is configured to adjust a pressure of the evaporator on the basis of the identified pressure reduction rate, and the pressure reduction rate identification unit includes a refrigerant precipitation gas volume calculation unit and a determination unit, wherein a volume of a refrigerant gas precipitated from the lubricating oil is calculated by the refrigerant precipitation gas volume calculation unit when the pressure is reduced at a predetermined pressure reduction rate, and wherein whether or not the foaming is permissible is determined by the determination unit on the basis of a comparison between the calculated volume and a volume on a surface of an oil in the oil tank.

According to a fifth aspect of the present invention, there is provided a program in which a turbo refrigeration machine including a turbo compressor which is configured to compress a refrigerant gas, a condenser which is configured to condense the refrigerant gas compressed by the turbo compressor by radiating heat through heat exchange, an expansion valve which is configured to expand a liquid refrigerant guided from the condenser, an evaporator which is configured to lower a temperature of chilled water flowing in from a chilled water inlet by causing the liquid refrigerant expanded by the expansion valve to absorb heat and to evaporate due to the heat exchange and then cause the chilled water to flow out from a chilled water outlet, an oil tank which stores lubricating oil to be supplied to the turbo compressor, and a pressure equalizing pipe which connects the oil tank to the evaporator is controlled by a refrigeration machine control device, wherein the refrigeration machine control device includes a pressure reduction rate identification unit which is configured to identify a pressure reduction rate at which foaming does not occur in the oil tank, and a pressure adjustment unit which is configured to adjust a pressure of the evaporator on the basis of the identified pressure reduction rate, wherein the pressure reduction rate identification unit includes a refrigerant precipitation gas volume calculation unit and a determination unit, wherein a volume of a refrigerant gas precipitated from the lubricating oil is calculated by the refrigerant precipitation gas volume calculation unit when the pressure is reduced at a predetermined pressure reduction rate, and wherein whether or not the foaming is permissible is determined by the determination unit on the basis of a comparison between the calculated volume and a volume on a surface of an oil in the oil tank.

Advantageous Effects of Invention

According to the above-described aspects of the present invention, it is possible to more reliably curb foaming in an oil tank.

DESCRIPTION OF EMBODIMENTS

First Embodiment

Hereinafter, a turbo refrigeration machine according to a first embodiment will be described with reference to FIGS. 1 to 6.

Overall Constitution of Turbo Refrigeration Machine

Figure 1:
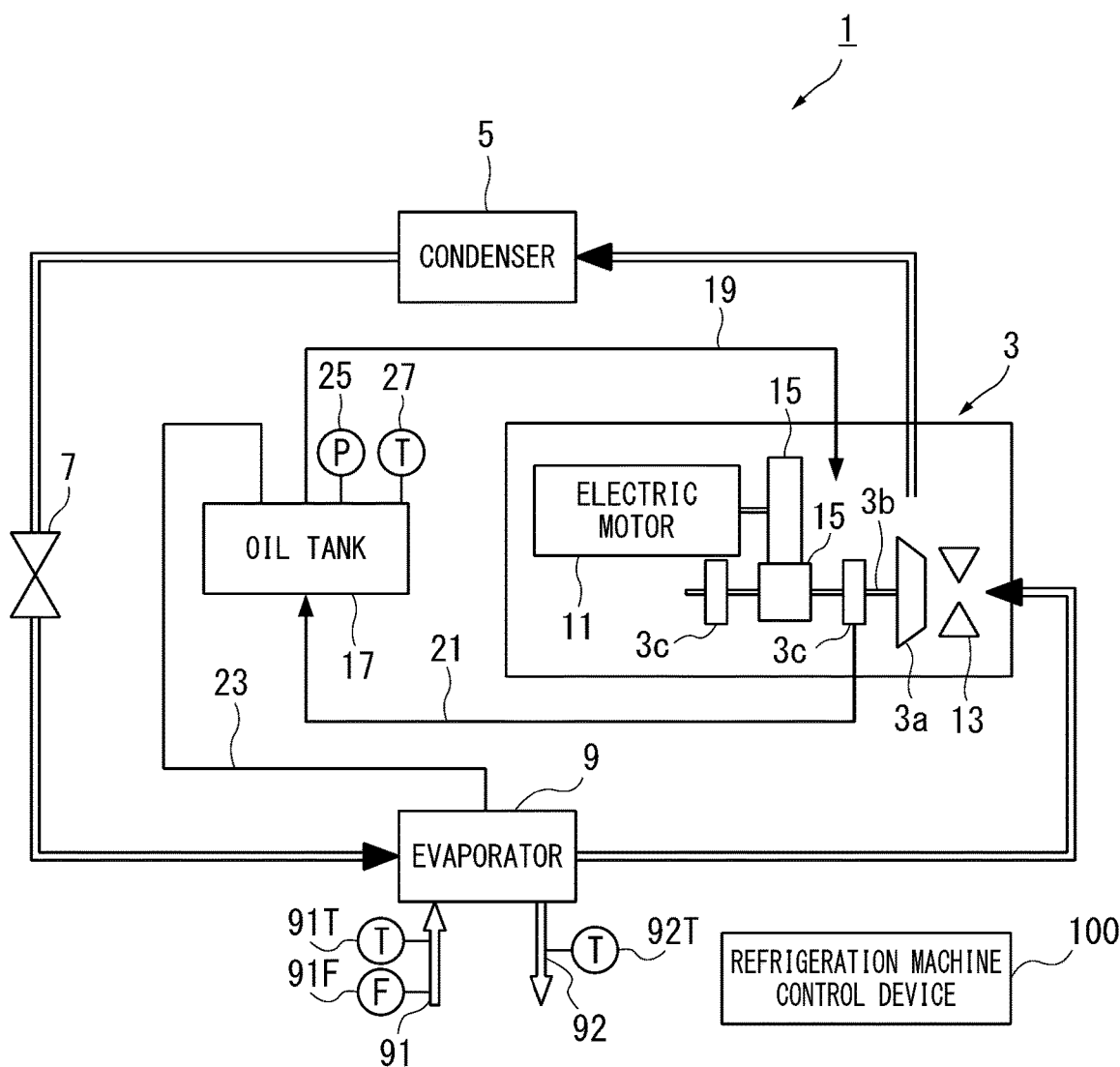
FIG. 1 is a diagram showing an overall constitution of a turbo refrigeration machine according to a first embodiment.

FIG. 1 is a diagram showing an overall constitution of the turbo refrigeration machine according to the first embodiment.

As shown in FIG. 1, the turbo refrigeration machine 1 includes a turbo compressor 3, a condenser 5, an expansion valve 7, an evaporator 9, and a refrigeration machine control device 100. The turbo compressor 3 compresses a refrigerant.

The condenser 5 condenses a high-temperature and high-pressure gas refrigerant compressed by the turbo compressor 3. The expansion valve 7 expands a liquid refrigerant guided from the condenser 5. The evaporator 9 evaporates the liquid refrigerant expanded by the expansion valve 7. The refrigeration machine control device 100 controls each of the parts including the turbo compressor 3, the condenser 5, the expansion valve 7, the evaporator 9, and the like. The refrigerant used in the turbo refrigeration machine 1 can be a low-pressure refrigerant such as HFO-1233zd (E) but is not limited thereto.

The turbo compressor 3 is a centrifugal compressor and is driven by an electric motor 11 of which a rotational speed is controlled by an inverter (not shown). An output of the inverter is controlled by the refrigeration machine control device 100. An inlet guide vane (hereinafter, referred to as "IGV") 13 which controls a flow rate of the intake refrigerant is provided at a refrigerant intake port of the turbo compressor 3, whereby capacity control of the turbo refrigeration machine 1 is possible. The opening degree control of the IGV 13 is performed by the refrigeration machine control device 100.

The turbo compressor 3 includes an impeller 3a which rotates around a rotation shaft 3b. Rotational power is transmitted from the electric motor 11 to the rotation shaft 3b via a speed increasing gear 15. The rotation shaft 3b is supported by a bearing 3c. Further, the turbo compressor 3 according to another embodiment may be a type (for example, electric motor direct connection type) in which such a speed increasing gear 15 is not provided.

The condenser 5 condenses the refrigerant gas compressed by the turbo compressor 3 by radiating heat through heat exchange with cooling water. The condenser 5 may be a heat exchanger of a shell and tube type, a plate type or the like. The cooling water for cooling the refrigerant is supplied to the condenser 5.

The cooling water guided to the condenser 5 discharges heat to the outside in a cooling tower or an air heat exchanger (not shown) and is then guided to the condenser 5 again.

The expansion valve 7 may be, for example, of an electric type, and an opening degree thereof is arbitrarily set by the refrigeration machine control device 100.

The evaporator 9 may be a heat exchanger of a shell and tube type, a plate type or the like. The evaporator 9 evaporates the liquid refrigerant expanded by the expansion valve 7 by heat exchange with the chilled water, thereby lowering a temperature of the chilled water flowing in from the chilled water inlet 91 and then causing the chilled water to flow out from a chilled water outlet 92. The chilled water flowing out from the chilled water outlet 92 is supplied to an external load (not shown). The chilled water is cooled to a rated temperature (for example, 7° C.) by exchanging heat with the refrigerant in the evaporator 9 and then sent to the external load.

A temperature sensor 91T and a flow rate sensor 91F are provided at the chilled water inlet 91. The temperature sensor 91T measures a temperature of the chilled water (a temperature of the chilled water inlet) at the chilled water inlet 91 and outputs a measurement result to the refrigeration machine control device 100. The flow rate sensor 91F measures a flow rate of the chilled water at the chilled water inlet 91 and outputs a measurement result to the refrigeration machine control device 100. A temperature sensor 92T is provided at the chilled water outlet 92. The temperature sensor 92T measures a temperature of the chilled water at the chilled water outlet 92 (a chilled water outlet temperature) and outputs a measurement result to the refrigeration machine control device 100.

Lubricating oil is supplied from an oil tank 17 to the bearing 3c and the speed increasing gear 15 of the turbo compressor 3. For example, mineral oil is used as the lubricating oil. An oil pump (not shown) is provided in the oil tank 17, and thus the lubricating oil is supplied through an oil supply pipe 19 at a predetermined flow rate. The lubricating oil which has performed a lubricating operation in the turbo compressor 3 is returned into the oil tank 17 through an oil return pipe 21.

A pressure equalizing pipe 23 is provided between the oil tank 17 and the evaporator 9 to allow communication therebetween. The pressure in the oil tank 17 and the pressure in the evaporator 9 are equalized by the pressure equalizing pipe 23. In this way, the dissolved amount of the refrigerant with respect to the lubricating oil is kept low by keeping the inside of the oil tank 17 at a low pressure.

A pressure sensor 25 and a temperature sensor 27 are provided in the oil tank 17. The pressure sensor 25 measures a pressure in the oil tank 17 and outputs a measurement result to the refrigeration machine control device 100. The temperature sensor 27 measures a temperature in the oil tank 17 (specifically, for example, a temperature of the lubricating oil) and outputs a measurement result to the refrigeration machine control device 100.

The refrigeration machine control device 100 performs control related to an operation of the turbo refrigeration machine 1 such as pressure control and temperature control of the turbo refrigeration machine 1, and the like. The refrigeration machine control device 100 includes, for example, a central processing unit (CPU), volatile and nonvolatile storage devices, an input/output device, a communication device, and the like. Additionally, a series of processes for realizing various functions is stored in a nonvolatile storage device or the like in the form of a program as an example, and the various functions are realized by the CPU reading the program into the volatile storage device or the like and performing information processing and arithmetic processing.

Constitution Example of Refrigeration Machine Control Device

Figure 2:
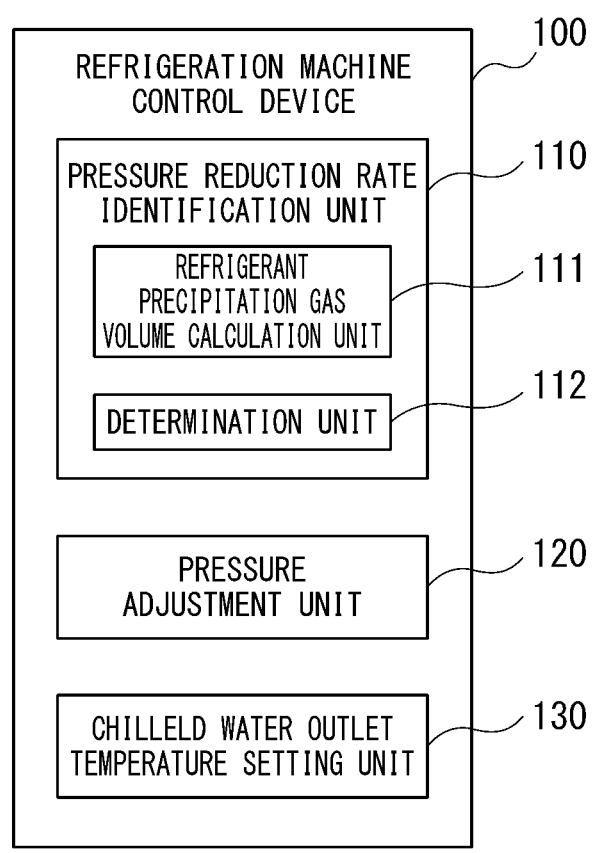
FIG. 2 is a diagram showing a constitution example of a refrigeration machine control device shown in FIG. 1.

FIG. 2 is a diagram showing a constitution example of the refrigeration machine control device shown in FIG. 1.

More specifically, FIG. 2 is a diagram showing that the functions realized by the CPU executing a predetermined program using hardware of the refrigeration machine control device 100 are divided into blocks.

As shown in FIG. 2, the refrigeration machine control device 100 includes a pressure reduction rate identification unit 110, a pressure adjustment unit 120, and a chilled water outlet temperature setting unit 130. Further, the pressure reduction rate identification unit 110 includes a refrigerant precipitation gas volume calculation unit 111 and a determination unit 112.

The pressure reduction rate identification unit 110 identifies a pressure reduction rate at which the foaming does not occur in the oil tank 17. The pressure adjustment unit 120 adjusts a pressure of the evaporator 9 on the basis of the pressure reduction rate identified by the pressure reduction rate identification unit 110. For example, the pressure adjustment unit 120 adjusts the pressure of the evaporator 9 by controlling the expansion valve 7, the IGV 13, a hot gas bypass (HGBP) valve (not shown), and the like based on the chilled water outlet temperature. Here, the hot gas bypass valve is a valve which controls the flow rate when some of the compressed gas (the hot gas) is guided to the suction side. The refrigerant precipitation gas volume calculation unit 111 of the pressure reduction rate identification unit 110 calculates a volume of the refrigerant gas precipitated from the lubricating oil when the pressure is reduced at a predetermined pressure reduction rate. The determination unit 112 determines whether or not the foaming is permissible on the basis of a comparison between the calculated volume and a volume on a surface of the oil in the oil tank. The chilled water outlet temperature setting unit 130 calculates an amount of decrease in evaporation temperature according to the identified pressure reduction rate and sets a value obtained by subtracting the amount of decrease in evaporation temperature from a set chilled water outlet temperature, which is a current target value of the temperature of the chilled water outlet 92, as a new set chilled water outlet temperature. For example, the pressure adjustment unit 120 adjusts the pressure of the evaporator 9 so that the measured value of the temperature of the chilled water outlet 92 matches the set chilled water outlet temperature set by the chilled water outlet temperature setting unit 130.

Figure 5:
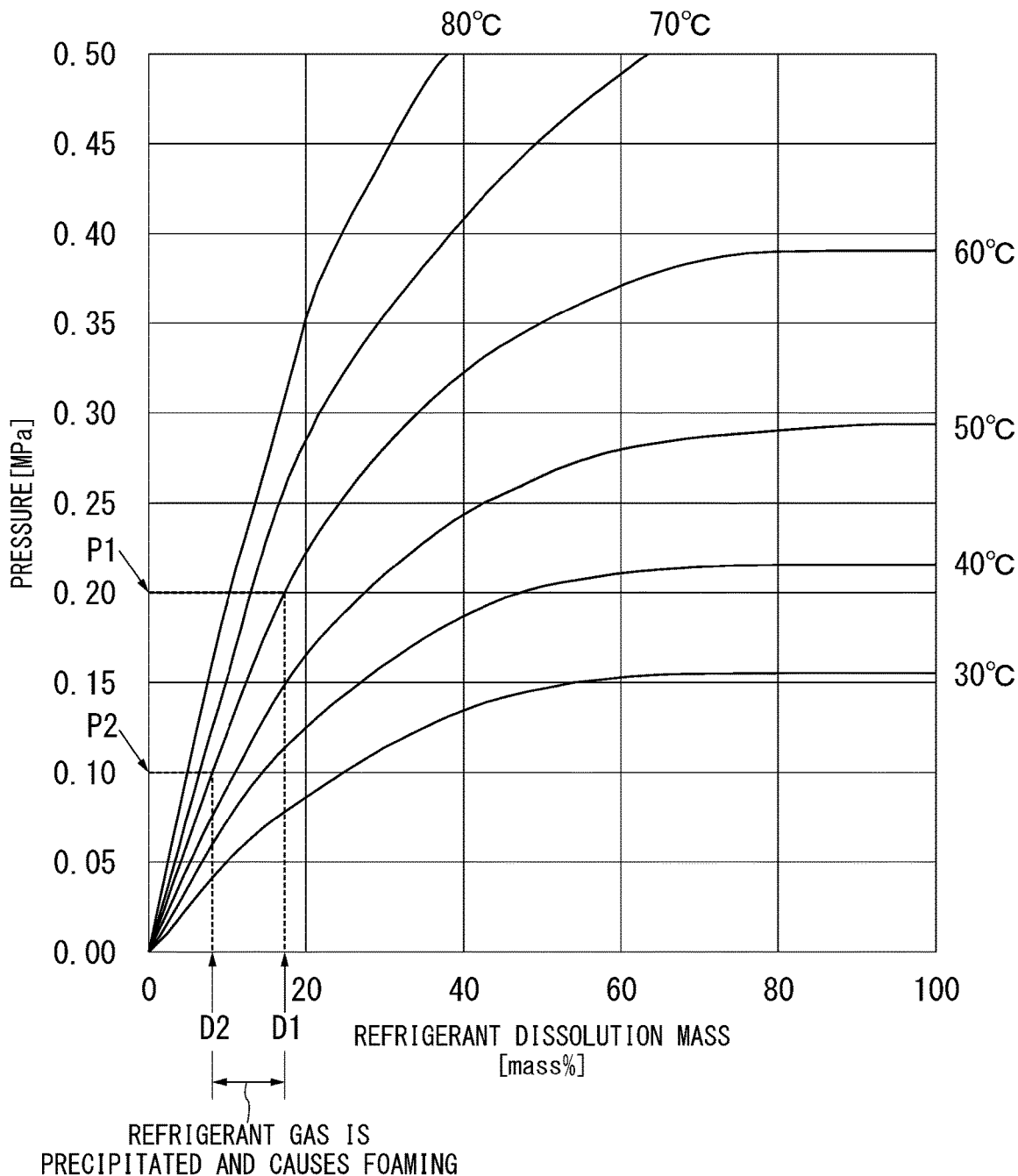
FIG. 5 is a graph showing a relationship between pressure and temperature and a dissolved amount of a refrigerant.

Further, in the refrigeration machine control device 100, refrigerant dissolution amount information related to the dissolved amount of the refrigerant as shown in FIG. 5 is stored in a predetermined storage region in the storage device. A description format of the refrigerant dissolution amount information may be a map format or a relational expression using an approximate expression or the like.

In FIG. 5, a horizontal axis represents the dissolved amount of the refrigerant [mass (weight) %] indicating the amount of refrigerant dissolved in the lubricating oil, and a vertical axis represents the pressure [MPa]. Each of curves shown in the drawing shows the dissolved amount of refrigerant at each temperature (the temperature of the lubricating oil). As can be seen from the drawing, each of the curves has an upwardly convex shape, as the pressure becomes lower, the dissolved amount of the refrigerant becomes smaller, and as the pressure becomes lower, a change in the dissolved amount of the refrigerant becomes greater. Furthermore, when compared at the same pressure, it can be seen that as the temperature becomes higher, the dissolved amount of the refrigerant becomes smaller.

In the characteristics shown in FIG. 5, for example, in the case in which the temperature in the oil tank 17 measured by the temperature sensor 27 is 60° C., the dissolved amount of the refrigerant changes from D1 to D2 when a measured value of the pressure sensor 25 changes from P1 to P2. In this case, a difference (D1–D2) is an elution amount of the refrigerant (an amount of the refrigerant dissolved in the lubricating oil is precipitated as a gas from the lubricating oil). The refrigeration machine control device 100 can calculate the elution amount of the refrigerant on the basis of the characteristics shown in FIG. 5. When the refrigerant comes out as a gas from the lubricating oil, the lubricating oil becomes foamy and an oil level rises, and the lubricating oil may fall (flow) from the oil tank 17 to the evaporator 9 through the pressure equalizing pipe 23. In such a case, when the lubricating oil is attached to a heat exchange tube of the evaporator 9, performance (a heat exchange amount) of the evaporator 9 is deteriorated. Further, the refrigerant gas released from the lubricating oil is determined according to a pressure difference generated within a certain time, and thus the oil level rapidly rises because the refrigerant gas is released all at once when the pressure reduction rate is high. In the embodiment, when the determination unit 112 determines whether or not the foaming is permissible on the basis of the comparison between the volume of the refrigerant gas precipitated from the lubricating oil and the volume on the surface of the oil in the oil tank 17, for example, it can determine whether or not the foaming is permissible under the following conditions. That is, the determination unit 112 can determine that a case in which the sum of a volume of the lubricating oil which is normally present in the oil tank 17 (a volume obtained by subtracting an amount of the lubricating oil circulating outside the oil tank 17 from a filling amount of the lubricating oil), a volume of the refrigerant precipitated from the lubricating oil, and a volume of the refrigerant dissolved in the lubricating oil exceeds a volume of the oil tank 17 is a case in which the foaming is not permissible. In this case, in the determination by the determination unit 112, a case in which the lubricating oil in the oil tank 17 may flow into the pressure equalizing pipe 23 due to the foaming is a case in which the foaming may not be permissible.

Operation Example

Next, a basic operation of the turbo refrigeration machine 1 having the above-described constitution will be described. Before startup of the turbo refrigeration machine 1, both the condenser 5 and the evaporator 9 are in a state near the environmental temperature, and the pressure in the condenser 5 and the pressure in the evaporator 9 are substantially equal. When the turbo refrigeration machine 1 is activated in this state, the turbo compressor 3 is rotated by a command from the refrigeration machine control device 100, and the refrigerant suctioned through the IGV 13 is discharged from the turbo compressor 3. The refrigerant discharged from the turbo compressor 3 is delivered to the condenser 5, passes through the expansion valve 7 and the evaporator 9, returns to the turbo compressor 3 and then circulates again. A velocity of the turbo compressor 3 is gradually increased by the command from the refrigeration machine control device 100, and the IGV 13 is gradually controlled in an opening direction from a fully closed state.

In the turbo refrigeration machine 1, the refrigerant becomes a high-temperature and high-pressure gas through the compressor 3 and flows into the condenser 5. In the condenser 5, the refrigerant (the high-temperature high-pressure gas) is deprived of heat and becomes a high-pressure liquid. Next, the refrigerant is decompressed all at once by the expansion valve 7, becomes a low-pressure liquid and is in a state in which it is easily evaporated. The liquid refrigerant which has been decompressed through the expansion valve 7 flows into the evaporator 9, receives heat from the chilled water which has flowed therein, and then evaporates. The evaporated low-pressure refrigerant gas becomes a high-temperature high-pressure gas again in the compressor 3. In the above-described refrigeration cycle, heat is exchanged between the refrigerant and the chilled water in the evaporator 9. The chilled water is deprived of heat by the refrigerant in the evaporator 9 and cooled to a target temperature ("the set chilled water outlet temperature"). Further, the evaporator 9 is on the "low pressure side" of the refrigeration cycle and is a place in which the pressure of the refrigerant is lowest during operation.

Process Flow

Figure 3:
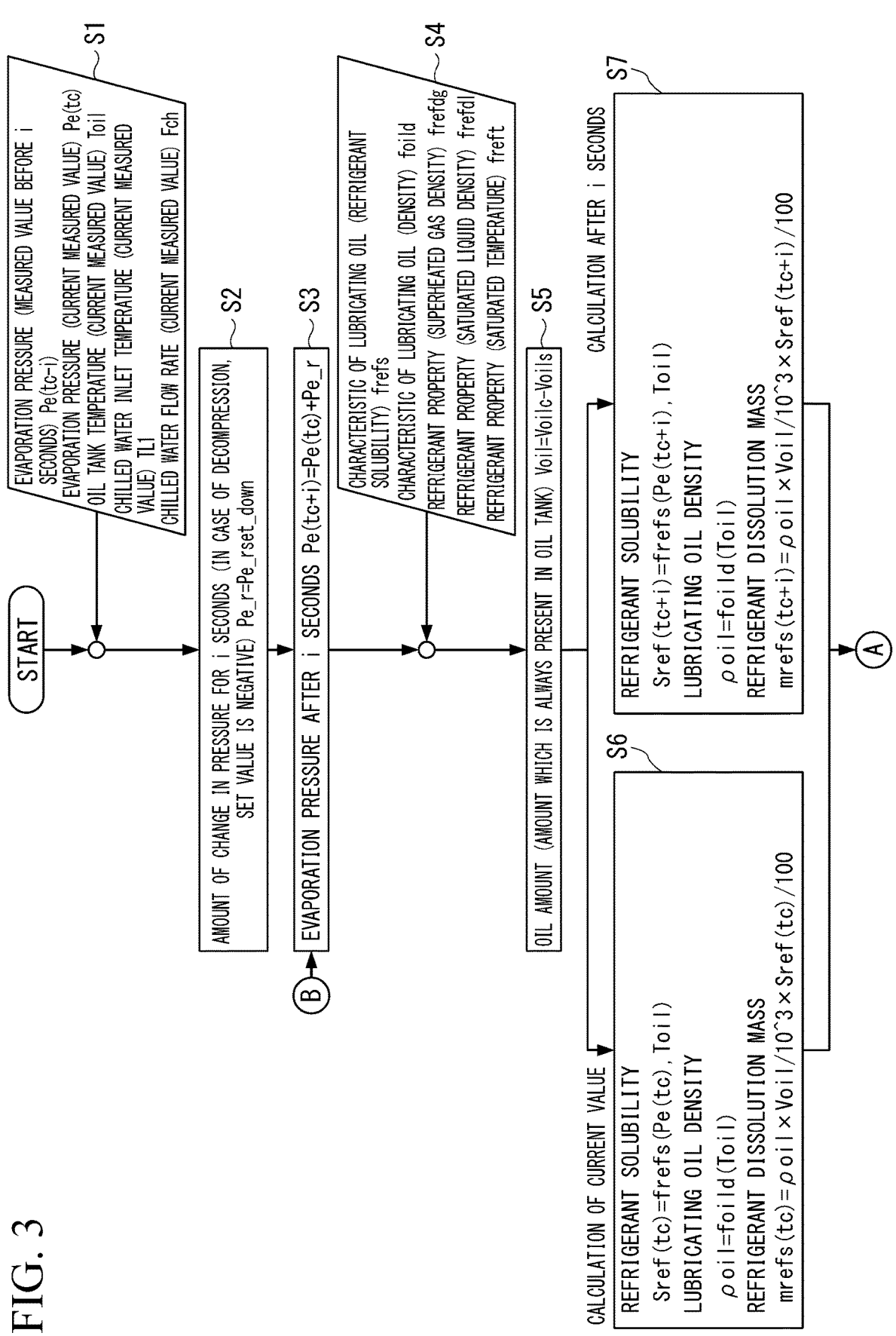
FIG. 3 is a first diagram showing an operation example of the refrigeration machine control device shown in FIG. 1.
Figure 4:
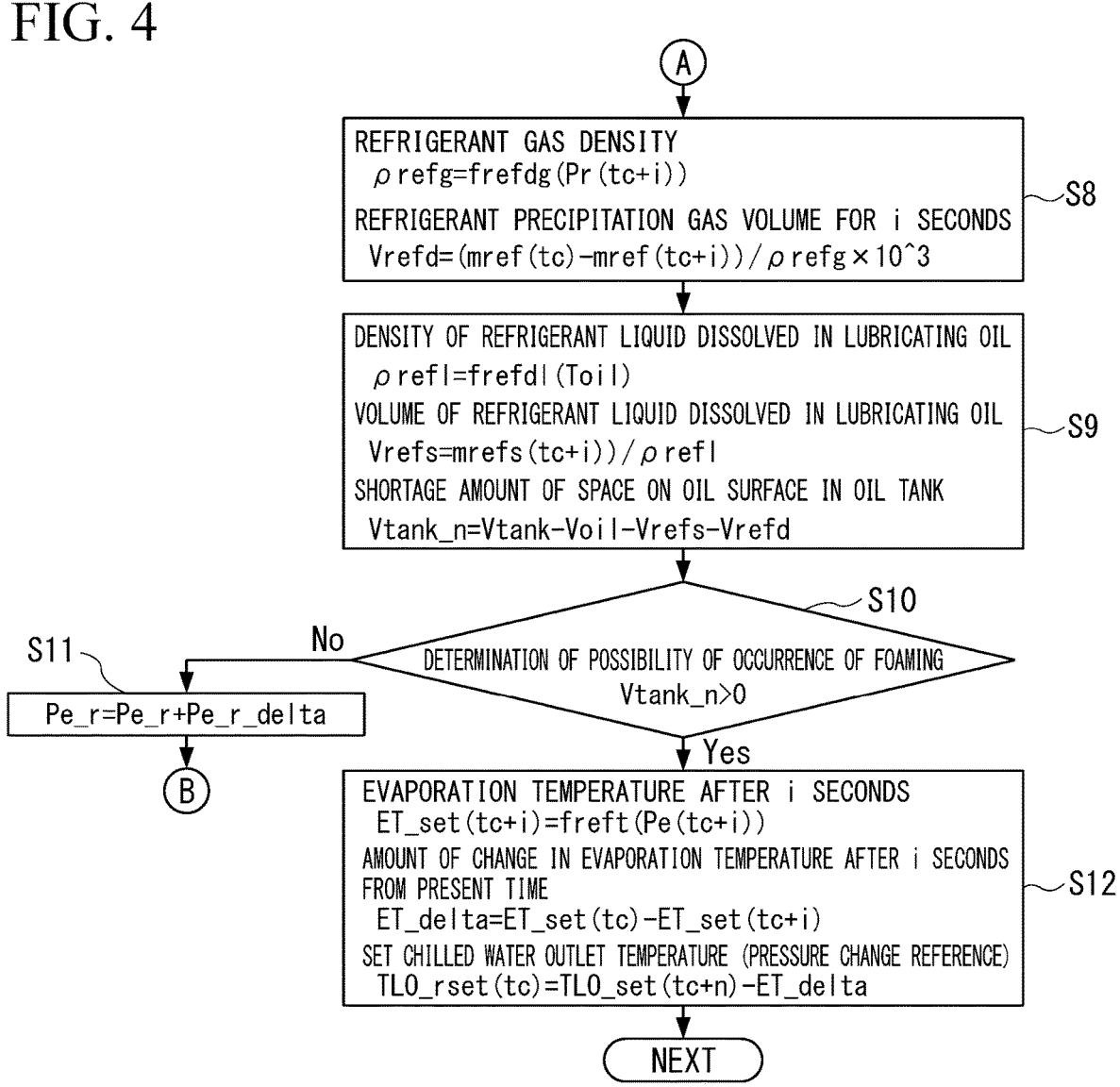
FIG. 4 is a second diagram showing the operation example of the refrigeration machine control device shown in FIG. 1.

FIGS. 3 and 4 are a first diagram and a second diagram showing the operation example of the refrigeration machine control device shown in FIG. 1.

Next, the operation example of the refrigeration machine control device 100 shown in FIG. 1 will be described with reference to FIGS. 3 and 4. FIGS. 3 and 4 are flowcharts showing a flow of a series of processes, and the flow shown in FIG. 3 and the flow shown in FIG. 4 are connected to each other by the same connector A or B. The processes shown in FIGS. 3 and 4 are a process performed by the refrigerant gas volume calculation unit 111 shown in FIG. 2 (Steps S1 to S9 and S11), a process performed by the determination unit 112 (Step S10), and a process performed by the chilled water outlet temperature setting unit 130 (Step S12). In the refrigeration machine control device 100, the pressure adjustment unit 120 adjusts the pressure of the evaporator 9 by performing feedback control of the temperature of the chilled water outlet 92 using the set chilled water outlet temperature determined by the chilled water outlet temperature setting unit 130 as a target value. The processes shown in FIGS. 3 and 4 are repeatedly performed at a constant cycle (for example, a cycle of several seconds to several tens of seconds) when the turbo refrigeration machine 1 is running, when a command value of the chilled water outlet temperature (a final target value of the set chilled water outlet temperature) and a current chilled water outlet temperature have a predetermined temperature difference.

In the processes shown in FIGS. 3 and 4, first, the refrigerant gas volume calculation unit 111 acquires an evaporation pressure (a measured value before i seconds) Pe(tc−i) (i is an arbitrary positive number), an evaporation pressure (a current measured value) Pe(tc), an oil tank temperature (a current measured value) Toil, a chilled water inlet temperature (a current measured value) TL1, and a chilled water flow rate (a current measured value) Fch (Step 1). The evaporation pressure (a measured value before i seconds) Pe(tc−i) is a measured value before i seconds by the pressure sensor 25. For example, the refrigerant gas volume calculation unit 111 sequentially records the evaporation pressure (the current measured value) Pe(tc) in a predetermined storage region in the storage device (records at least one cycle of the processes) and acquires the stored value as the evaporation pressure (the measured value before i seconds) Pe(tc−i). The evaporation pressure (the current measured value) Pe(tc) is a current measured value of the pressure sensor 25. The oil tank temperature (the current measured value) Toil is a current measured value of the temperature sensor 27. The chilled water inlet temperature (the current measured value) TL1 is a current measured value of the temperature sensor 91T. The chilled water flow rate (the current measured value) Fch is a current measured value of the flow rate sensor 91E. Also, the pressure of the evaporator 9, that is, the evaporation pressure, is the same as the pressure of the oil tank 17 due to a communication effect of the pressure equalizing pipe 23 as described above.

Next, the refrigerant gas volume calculation unit 111 sets a pressure change amount (a pressure reduction rate) Pe_r for i seconds to an initial value Pe_rset_down (Step S2). Also, the initial value Pe_rset_down is a negative value. The initial value Pe_rset_down is set in advance to correspond to the turbo refrigeration machine 1. The refrigerant gas volume calculation unit 111 obtains the pressure change amount Pe_r in which the foaming does not occur while changing the pressure change amount Pe_r from the initial value Pe_rset_down by a predetermined amount Pe_r_delta (Step S11). As the pressure change amount Pe_r becomes greater, the possibility that the foaming is not permissible becomes higher, but followability of the chilled water outlet temperature with respect to the target value can be enhanced. Therefore, it is desirable to set the initial value Pe_rset_down to a value in the vicinity of a boundary as to whether or not the foaming is permissible.

Next, the refrigerant gas volume calculation unit 111 calculates an evaporation pressure Pe(tc+i) after i seconds by adding the evaporation pressure (the current measured value) Pe(tc) and the pressure change amount Pe_r (Step S3).

Next, the refrigerant gas volume calculation unit 111 acquires (or calculates) the following values from, for example, a predetermined storage region in the storage device included in the refrigeration machine control device 100 (Step S4). That is, in Step S4, the refrigerant gas volume calculation unit 111 acquires a lubricating oil characteristic (a refrigerant solubility) fiefs, a lubricating oil characteristic (density) foild, a refrigerant physical property (a superheated gas density) frefdg, a refrigerant physical property (a saturated liquid density) frefdl, and a refrigerant physical property (a saturated temperature) freft.

Next, the refrigerant gas volume calculation unit 111 calculates an oil amount (an amount which is always present in the oil tank 17) Voil by subtracting an oil amount (an amount which is always present in an oil supply/discharge pipe) Voils from an oil filling (charge) amount Voile (Step S5).

Next, the refrigerant gas volume calculation unit 111 calculates the current values and the values after i seconds of the refrigerant solubility, the lubricating oil density, and the refrigerant dissolution mass (Step S6 and Step S7). In Step 6, for the current values, the refrigerant gas volume calculation unit 111 determines the refrigerant solubility Sref (tc) from the lubricating oil characteristic (the refrigerant solubility) frefs corresponding to the evaporation pressure (the current measured value) Pe(tc) and the oil tank temperature (the current measured value) Toil. Here, the lubricating oil characteristic (the refrigerant solubility) frefs is an equation representing a characteristic of a graph shown in FIG. 5. Further, the refrigerant gas volume calculation unit 111 determines the lubricating oil density $\rho$oil from the lubricating oil characteristic (the density) foild corresponding to the oil tank temperature (the current measured value) Toil. Furthermore, the refrigerant gas volume calculation unit 111 determines the refrigerant dissolution mass mrefs (tc) from the equation $\rho$oil×Voil/10^3×Sref(tc)/100 based on the oil amount (the amount which is always present in the oil tank) Voil, the lubricating oil density $\rho$oil, and the refrigerant solubility Sref(tc).

On the other hand, in Step 7, the refrigerant gas volume calculation unit 111 determines the refrigerant solubility Sref(tc+i) after i seconds from the lubricating oil characteristic (the refrigerant solubility) fiefs corresponding to the evaporation pressure Pe(tc+i) after i seconds and the oil tank temperature (the current measured value) Toil. Further, the refrigerant gas volume calculation unit 111 determines the lubricating oil density $\rho$oil after i seconds from the lubricating oil characteristic (density) foild corresponding to the oil tank temperature (the current measured value) Toil. Furthermore, the refrigerant gas volume calculation unit 111 determines the refrigerant dissolution mass mrefs(tc+i) after i seconds from the equation $\rho$oil×Voil/10^3×Sref(tc+i)/100 based on the oil amount (the amount which is always present in the oil tank) Voil, the lubricating oil density $\rho$oil and the refrigerant solubility Sref(tc+i) after i seconds.

Next, the refrigerant gas volume calculation unit 111 determines a refrigerant gas density $\rho$refg and a refrigerant precipitation gas volume Vrefd for i seconds as follows (Step S8). That is, in Step 8, the refrigerant gas volume calculation unit 111 determines the refrigerant gas density $\rho$refg from the refrigerant physical property (the superheated gas density) frefdg corresponding to the evaporation pressure Pe(tc+i) after i seconds. Further, the refrigerant gas volume calculation unit 111 determines the refrigerant precipitation gas volume Vrefd for i seconds from the equation (mref(tc)−mref(tc+i))/$\rho$refg×10^3 based on the current refrigerant dissolution mass mrefs(tc), the refrigerant dissolution mass mrefs(tc+i) after i seconds, and the refrigerant gas density ρrefg which are obtained in Steps S6 to S8.

Next, the refrigerant gas volume calculation unit 111 determines a refrigerant liquid density ρrefl dissolved in the lubricating oil, a refrigerant liquid volume Vrefs dissolved in the lubricating oil, and a shortage amount Vtank_n of a space on the surface of the oil in the oil tank as follows (Step 9). That is, in Step 9, the refrigerant gas volume calculation unit 111 determines the refrigerant liquid density ρrefl dissolved in the lubricating oil from the refrigerant physical property (the saturated liquid density) frefdl(Toil) corresponding to the oil tank temperature (the current measured value) Toil. Further, the refrigerant gas volume calculation unit 111 determines the refrigerant liquid volume Vrefs dissolved in the lubricating oil from the equation mrefs(tc+i)/ρrefl based on the refrigerant dissolution mass mrefs(tc+i) after i seconds and the refrigerant liquid density ρrefl dissolved in the lubricating oil. Furthermore, the refrigerant gas volume calculation unit 111 calculates the shortage amount Vtank_n of the space on the surface of the oil in the oil tank from the following equation based on the oil tank volume Vtank, the oil amount (the amount which is always present in the oil tank) Voil, the refrigerant liquid volume Vrefs dissolved in the lubricating oil, and the refrigerant precipitation gas volume Vrefd for i seconds. That is, the refrigerant gas volume calculation unit 111 calculates the shortage amount Vtank_n of the space on the surface of the oil in the oil tank from the equation Vtank-Voil-Vrefs-Vrefd.

Next, the determination unit 112 determines possibility of occurrence of the foaming (Step S10). In Step S10, the determination unit 112 determines that there is no possibility of the occurrence of the foaming when the shortage amount Vtank_n of the space on the surface of the oil in the oil tank is greater than 0 (Yes in Step S10) and determines that there is the possibility of the occurrence of the foaming when it is 0 or less (No in Step S10). When the determination unit 112 determines in Step S10 that there is the possibility of the occurrence of the foaming (in the case of No in Step S10), the refrigerant gas volume calculation unit 111 reduces an absolute value of the pressure change amount Pe_r by a predetermined value (Pe_r_delta) (Step S11) and performs the processes after Step S3 again. On the other hand, when the determination unit 112 determines in Step S10 that there is no possibility of the occurrence of the foaming (in the case of Yes in Step S10), the chilled water outlet temperature setting unit 130 determines the set chilled water outlet temperature TLO_rset(tc) as follows (Step S12).

That is, in Step S12, first, the chilled water outlet temperature setting unit 130 determines an evaporation temperature ET_set(tc+i) after i seconds as follows. That is, the chilled water outlet temperature setting unit 130 determines the evaporation temperature ET_set(tc+i) after i seconds from the refrigerant physical property (the saturated temperature) freft corresponding to the evaporation pressure Pe(tc+i) after i seconds. The evaporation pressure and the evaporation temperature uniquely correspond to each other. That is, the evaporation temperature of the refrigerant (the temperature at which the refrigerant evaporates) varies in a one-to-one correspondence with the evaporation pressure of the refrigerant as a unique characteristic of the refrigerant.

Next, the chilled water outlet temperature setting unit 130 calculates the evaporation temperature change amount ET_delta after i seconds from a present time by subtracting the evaporation temperature ET_set(tc+i) after i seconds from a current evaporation temperature ET_set(tc). Here, the current evaporation temperature ET_set(tc) can be determined from the refrigerant physical property (the saturated temperature) freft corresponding to the current evaporation pressure Pe(tc).

Next, the chilled water outlet temperature setting unit 130 sets the set chilled water outlet temperature (a pressure change reference) TLO_rset(tc) as follows (Step S12). That is, the chilled water outlet temperature setting unit 130 can calculate the set chilled water outlet temperature (the pressure change reference) TLO_rset(tc) by subtracting the evaporation temperature change amount ET_delta after i seconds from the present time from the previous set chilled water outlet temperature (the pressure change reference) TLO_rset(tc+n). The evaporation temperature of the refrigerant in the evaporator 9 directly corresponds to the temperature of the chilled water (the chilled water outlet temperature). For example, when the evaporation pressure in the evaporator 9 is set to 0.2 MPa, the evaporation temperature in the evaporator 9 is 23° C., and the chilled water outlet temperature is 20° C. or the like corresponding thereto. Further, when the evaporation pressure is reduced so that the evaporation temperature of the evaporator 9 changes from 23° C. to 20° C., the chilled water outlet temperature changes from 20° C. to 17° C. corresponding thereto.

When the above-described processes are completed, the refrigeration machine control device 100 controls the chilled water outlet temperature by the pressure adjustment unit 120 based on the set chilled water outlet temperature (the pressure change reference) TLO_rset(tc) set in Step S12.

Figure 6:
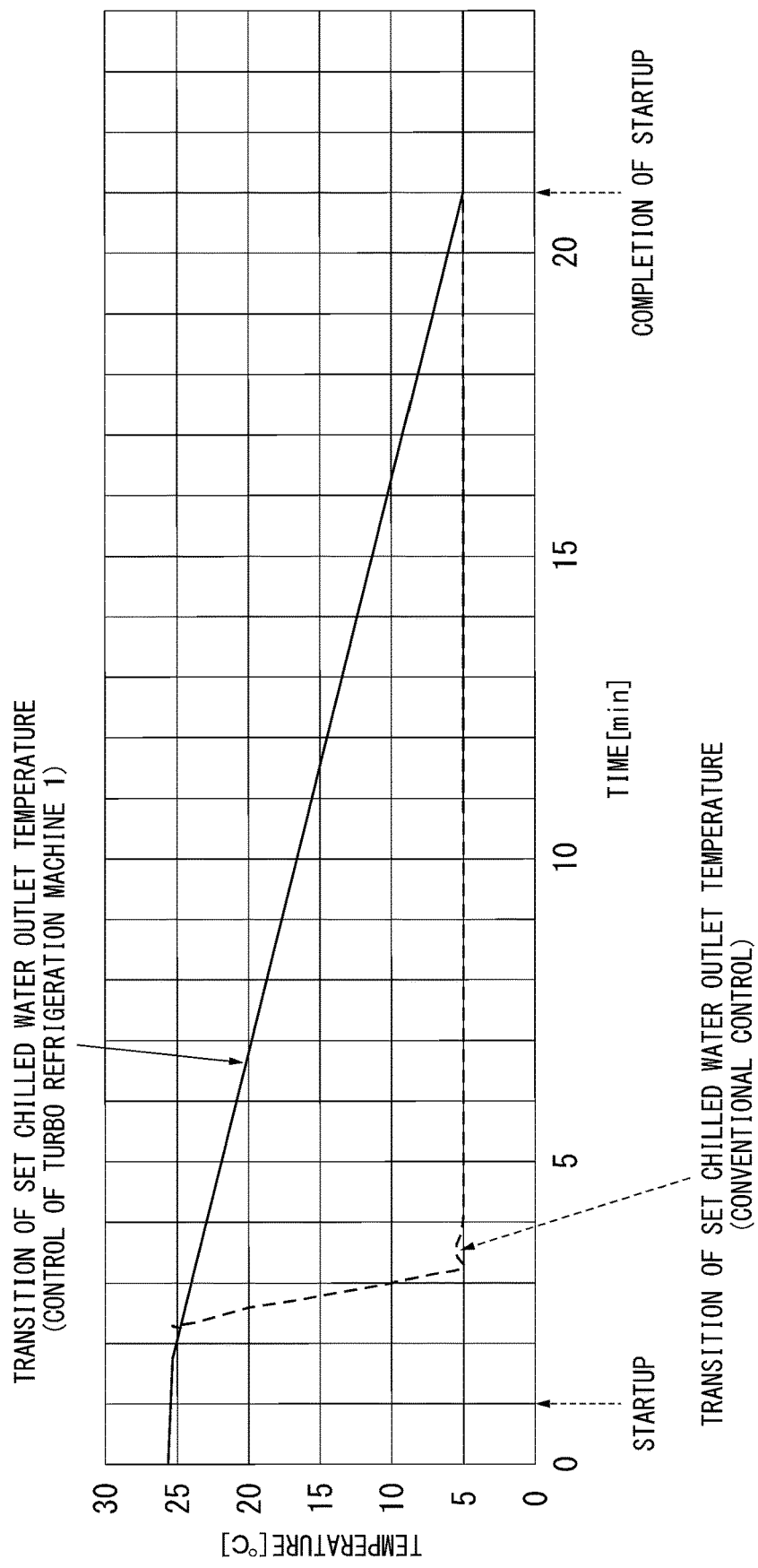
FIG. 6 is a diagram showing the operation example of the refrigeration machine control device shown in FIG. 1.

FIG. 6 is a diagram showing a result in which the operation example of the embodiment is confirmed.

In FIG. 6, a horizontal axis is time, a vertical axis is temperature, and it shows how the set chilled water outlet temperature set by the chilled water outlet temperature setting unit 130 changes when the final value of the set chilled water outlet temperature is set to 5° C. after the turbo refrigeration machine 1 is activated. Here, according to the turbo refrigeration machine 1, the set chilled water outlet temperature set by the chilled water outlet temperature setting unit 130 changes gradually with respect to the final value of 5° C. of the set chilled water outlet temperature. That is, in the conventional refrigeration machine, it was controlled to set the chilled water outlet temperature to 5° C. (the final value) immediately after the activating, but in the turbo refrigeration machine 1 according to the embodiment, the set chilled water outlet temperature is gradually brought closer to 5° C. (the final value), such as 20° C., 18° C., . . . .

As described above, according to the embodiment, the refrigeration machine control device 100 controls the pressure of the evaporator 9 while estimating a foaming state in the oil tank 17. That is, the refrigeration machine control device 100 estimates how much refrigerant gas comes out as the pressure of the evaporator 9 is reduced and changes the pressure reduction rate when the remainder of the oil tank 17 is zero. Additionally, the refrigeration machine control device 100 sets the set chilled water outlet temperature (the target value of the chilled water outlet temperature) according to the indentified pressure reduction rate and performs the temperature control of the chilled water outlet temperature, thereby controlling the pressure reduction rate in the pressure of the evaporator 9. Here, the set chilled water outlet temperature is a desired set value of the temperature of the chilled water. For example, when the set chilled water outlet temperature is set to 5° C., the pressure adjustment unit 120 controls (depressurizes) the pressure of the evaporator 9 by controlling the IGV 13 (the vane), the expansion valve 7, the hot gas bypass valve, and the like in linkage in a balanced manner and thus performs the control so that the chilled water actually matches the target temperature (5° C.). For example, when the set chilled water outlet temperature is suddenly set to 5° C. from 25° C., the pressure reduction rate in the evaporator 9 becomes steep, and thus the foaming occurs. On the other hand, in the embodiment, the set value can be gradually brought closer to 5° C. from 25° C. at a speed at which the foaming does not occur. Further, in the embodiment, since the pressure adjustment of the evaporator 9 is performed by controlling the IGV 13, the expansion valve 7, the hot gas bypass valve and the like in linkage in a feedback control of the chilled water outlet temperature, stability of the control of the chilled water outlet temperature is not lowered, for example, as compared with a case in which each of the IGV 13, the expansion valve 7, the hot gas bypass valve and the like is directly controlled.

As described above, in the embodiment, the pressure reduction rate identification unit 110 including the refrigerant precipitation gas volume calculation unit 111 which calculates the volume of the refrigerant gas precipitated from the lubricating oil when the pressure is reduced at a predetermined pressure reduction rate and the determination unit 112 which determines whether or not the foaming is permissible on the basis of a comparison between the calculated volume and the volume on the surface of the oil in the oil tank 17 identifies the pressure reduction rate Pe_r at which the foaming does not occur in the oil tank 17. Then, the pressure adjustment unit 120 adjusts the pressure of the evaporator 9 on the basis of the identified pressure reduction rate. Therefore, according to the present invention, the foaming in the oil tank 17 can be more reliably curbed.

In addition, the embodiment can be modified as follows, for example. For example, in the flowcharts shown in FIGS. 3 and 4, when the change amount of the current evaporation pressure exceeds a predetermined value from i seconds ago, a process in which the evaporation pressure is changed in a direction of pressurization instead of depressurization may be added.

In this case, when the set chilled water outlet temperature is higher than the current chilled water inlet temperature, a process of correcting the set chilled water outlet temperature to be lower than the chilled water inlet temperature may be added. Further, when the set chilled water outlet temperature requires an output which exceeds the rated refrigeration capacity, a process of correcting the set chilled water outlet temperature may be added. Furthermore, when (a change rate of) the set chilled water outlet temperature does not satisfy required specifications of the turbo refrigeration machine 1, a process of correcting the set chilled water outlet temperature may be added.

Second Embodiment

Next, a turbo refrigeration machine according to a second embodiment will be described.

In the first embodiment, it has been described that the chilled water is cooled to the set chilled water outlet temperature by heat exchange (heat absorption) with the refrigerant in the evaporator 9 and is used for a cooling application in which the chilled water is circulated to an external load. In the second embodiment, it will be described that hot water is heated to a set hot water outlet temperature by heat exchange (radiation) with the refrigerant in the condenser 5 and is used for a heating application in which the hot water is circulated to an external load.

The "chilled water" which circulates between the evaporator 9 and the external load (an object to be cooled) in the first embodiment corresponds to "heat source water" which circulates between the evaporator 9 and a predetermined heat source in the second embodiment. Further, the "cooling water" which circulates between the condenser 9 and the cooling tower or the like in the first embodiment corresponds to "hot water" which circulates between the condenser 9 and an external load (an object to be heated) in the second embodiment.

In the first embodiment, the reduction rate of the set outlet chilled water temperature is adjusted so that the pressure reduction rate in the evaporator 9 is curbed to an extent in which the foaming does not occur (refer to the process in Step S12 in FIG. 4). Here, the amount of change in the set outlet chilled water temperature and the amount of change in the evaporation temperature (the evaporation pressure) in the evaporator 9 have a one-to-one correspondence relationship to an extent.

One the other hand, in the second embodiment, it is necessary to adjust an increase rate of the set outlet hot water temperature so that the pressure reduction rate in the evaporator 9 is curbed to an extent in which the foaming does not occur. Here, an amount of change in the set outlet hot water temperature and an amount of change in a condensation temperature (a condensation pressure) in the condenser 5 have a one-to-one correspondence relationship to an extent. However, the relationship between the amount of change of the set outlet hot water temperature and the amount of change of the evaporation temperature (the evaporation pressure) in the evaporator 9 is not limited thereto.

Therefore, the refrigeration machine control device 100 (a hot water outlet temperature setting unit) according to the second embodiment performs the following process instead of Step S12 in FIG. 4.

That is, in Step S12, first, the hot water outlet temperature setting unit of the refrigeration machine control device 100 determines the evaporation temperature ET_set(tc+i) after i seconds as follows. That is, the hot water outlet temperature setting unit determines the evaporation temperature ET_set (tc+i) after i seconds from the refrigerant physical property (the saturated temperature) freft corresponding to the evaporating pressure Pe(tc+i) after i seconds.

Next, the hot water outlet temperature setting unit calculates an evaporation temperature change amount ET_delta after i seconds from the present time by subtracting the evaporation temperature ET_set(tc+i) after i seconds from the current evaporation temperature ET_set(tc). Here, the current evaporation temperature ET_set(tc) can be determined from the refrigerant physical property (the saturated temperature) freft corresponding to the current evaporation pressure Pe(tc).

Next, the hot water outlet temperature setting unit determines a heat source water outlet temperature TLO(tc+i) after i seconds by subtracting the evaporation temperature change amount ET_delta after i seconds from a current heat source water outlet temperature (a current measured value) TLO (TLO(tc+i)=TLO−ET_delta).

Next, the hot water outlet temperature setting unit obtains a heat source water average temperature TLOave(tc+i) after i seconds from the equation TLOave(tc+i)=[TLI+TLO (tc+i)]/2. In addition, a heat source water inlet temperature after i seconds cannot be estimated. Therefore, here, the heat source water average temperature TLOave(tc+i) is estimated using the current heat source water inlet temperature TLI (a current measured value).

Next, the hot water outlet temperature setting unit obtains a specific heat Cwl [kcal/m$^3$·K] of the heat source water after i seconds from the following equation using the heat source water average temperature TLOave(tc+i) after i seconds.

$$Cwl = 0.000015878 \times TLOave(tc+i)3 - 0.005962 \times TLOave(tc+i)2 + 0.022365 \times TLOave(tc+i) + 999.96$$

Further, the hot water outlet temperature setting unit obtains a heat source water specific gravity γwl after i seconds from the following equation using the heat source water average temperature TLOave(tc+i) after i seconds.

$$\gamma wl = (-0.000000045517) \times TLOave(tc+i)3 + 0.000010313 \times TLOave(tc+i)2 - 0.00058436 \times TLOave(tc+i) + 1.0075$$

Next, the hot water outlet temperature setting unit calculates a refrigeration capacity Ql(tc+i) [kW] after i seconds in the evaporator 9 from the following equation using the specific heat Cwl of the heat source water after i seconds and the specific gravity γwl of the heat source water after i seconds. In the following equation, Fcl is a heat source water flow rate (a current measured value).

$$Ql(tc+i) = [TLI - TLO(tc+i)] \times Fcl \times Cwl \times \gamma wl / 3024 \times 3.516$$

Next, the hot water outlet temperature setting unit calculates a heating capacity Qh(tc+i)[kW] in the condenser 5 by adding an inverter power consumption to the refrigeration capacity Ql(tc+i) in the evaporator 9. In the following equation, Pinv is the inverter power consumption (a current measured value).

$$Qh(tc+i) = Ql(tc+i) + Pinv$$

Next, the hot water outlet temperature setting unit obtains the hot water average temperature THOave(tc+i) after i seconds from the equation THOave(tc+i)=[THI+THO]/2. The hot water inlet temperature and the hot water outlet temperature after i seconds cannot be estimated. Therefore, here, the hot water average temperature TLOave(tc+i) after i seconds is estimated using a current hot water inlet temperature THI (a current measured value) and a current hot water outlet temperature THO (a current measured value).

Next, the hot water outlet temperature setting unit obtains a specific heat Cwh [kcal/m³·K] of the hot water after i seconds from the following equation using the hot water average temperature THOave(tc+i) after i seconds.

$$Cwh = 0.000015878 \times THOave(tc+i)3 - 0.005962 \times THOave(tc+i)2 + 0.022365 \times THOave(tc+i) + 999.96$$

Further, the hot water outlet temperature setting unit obtains a hot water specific gravity γwh after i seconds from the following equation using the hot water average temperature THOave(tc+i) after i seconds.

$$\gamma wh = (-0.000000045517) \times THOave(tc+i)3 + 0.000010313 \times THOave(tc+i)2 - 0.00058436 \times THOave(tc+i) + 1.0075$$

Next, the hot water outlet temperature setting unit obtains a set hot water outlet temperature THO_reset from the following equation using the current value THI of the hot water inlet temperature, the heating capacity Qh(tc+i) after i seconds, the hot water flow rate Fch, the specific heat Cwh of the hot water after i seconds, and the specific gravity γwh of the hot water after i seconds. In the following equation, the hot water outlet temperature setting unit obtains the set hot water outlet temperature THO_reset by adding a temperature difference which can be added to the hot water by the heating capacity Qh(tc+i) and the hot water flow rate Fch to the current value of the hot water inlet temperature.

$$THO\_rset = THI + Qh(tc+i)/3.516 \times 3024/(Fch \times Cwh \times \gamma wh)$$

When the above-described processes are completed, the refrigeration machine control device 100 controls the hot water outlet temperature by a pressure adjustment unit 120 based on the set hot water outlet temperature (a pressure change reference) THO_rset (tc) set in the above-described step.

In this way, the refrigeration machine control device 100 (the hot water outlet temperature setting unit) according to the second embodiment calculates the cooling capacity Ql(tc+i)[kW] obtained when the evaporator 9 is depressurized at a pressure reduction rate at which the foaming does not occur. Then, the refrigeration machine control device 100 calculates a rising temperature of the hot water when the condenser 5 obtains the heating capacity Qh(tc+i) under the premise that the cooling capacity on the evaporator 9 side and the heating capacity on the condenser 5 side are equivalent (however, in the above-described example, the inverter power consumption Pinv is added to the cooling capacity Q1). Then, the refrigeration machine control device 100 sets a value obtained by adding a calculation result of the rising temperature to the current hot water inlet temperature THI as a new set hot water outlet temperature THO_rset.

Thus, as a result in which the pressure adjustment unit 120 controls the condensation pressure in the condenser 5 so that the hot water outlet temperature (the current measured value) approaches a target value (the set hot water outlet temperature THO_rset), the pressure reduction rate generated on the evaporator 9 side is curbed to a pressure reduction rate at which the foaming does not occur in the oil tank 17.

Further, in each of the above-described embodiments, the process of the various processes of the refrigeration machine control device 100 described above is stored in a computer-readable recording medium in the form of a program, and the various processes are performed by the computer reading and executing this program. Further, the computer-readable recording medium is a magnetic disk, a magneto-optical disk, a CD-ROM, a DVD-ROM, a semiconductor memory, or the like. Furthermore, the computer program may be transmitted to the computer via a communication line, and the computer which has received the transmission may execute the program.

The program may be for realizing some of the above-described functions. Further, the program may be a so-called difference file (a difference program) which can realize the above-described functions in combination with a program already recorded in a computer system. Further, the refrigeration machine control device 100 may be configured by a single computer, or may be configured by a plurality of computers connected to be conmunicable with each other.

As described above, although several embodiments according to the present invention have been described, all the embodiments are presented as examples and are not intended to limit the scope of the invention. The embodiments can be implemented in various other forms, and various omissions, replacements, and changes can be made without departing from the scope of the invention. The embodiments and modifications thereof are included in the invention described in the claims and the equivalents thereof, as well as included in the scope and gist of the invention.

INDUSTRIAL APPLICABILITY

According to the above-described aspect of the present invention, the foaming in the oil tank can be more reliably curbed.

REFERENCE SIGNS LIST

1 Turbo refrigeration machine
3 Turbo compressor
3a Impeller
3b Rotation shaft
3c Bearing
5 Condenser
7 Expansion valve
9 Evaporator
11 Electric motor
13 IGV (inlet guide vane)
15 Speed increasing gear
17 Oil tank
19 Oil supply pipe
21 Oil return pipe
23 Pressure equalizing pipe
25 Pressure sensor
27 Temperature sensor
91 Chilled water inlet
91T Temperature sensor
91F Flow rate sensor
92 Chilled water outlet
92T Temperature sensor
100 Refrigeration machine control device
110 Pressure reduction rate identification unit
111 Refrigerant precipitation gas volume calculation unit
112 Determination unit
120 Pressure adjustment unit
130 Chilled water outlet temperature setting unit

What is claimed is:

1. A refrigeration machine control device which is configured to control a turbo refrigeration machine and includes a turbo compressor which is configured to compress a refrigerant gas, a condenser which is configured to condense the refrigerant gas compressed by the turbo compressor by radiating heat through heat exchange, an expansion valve which is configured to expand a liquid refrigerant guided from the condenser, an evaporator which is configured to lower a temperature of chilled water flowing in from a chilled water inlet by causing the liquid refrigerant expanded by the expansion valve to absorb heat and to evaporate due to heat exchange and then cause the chilled water to flow out from a chilled water outlet, an oil tank which stores lubricating oil to be supplied to the turbo compressor, and a pressure equalizing pipe which connects the oil tank to the evaporator, the device comprising:
a processor configured to perform the functions of:
a pressure reduction rate identification unit which is configured to identify a pressure reduction rate at which foaming does not occur in the oil tank; and
a pressure adjustment unit which is configured to adjust a pressure of the evaporator on the basis of the identified pressure reduction rate,
wherein the pressure reduction rate identification unit includes:
a refrigerant precipitation gas volume calculation unit which is configured to calculate a volume of a refrigerant gas precipitated from the lubricating oil when the pressure is reduced at a predetermined pressure reduction rate; and
a determination unit which is configured to determine whether or not the foaming is permissible on the basis of a comparison between the calculated volume and a volume on a surface of an oil in the oil tank,
wherein the refrigerant precipitation gas volume calculation unit is configured to calculate the volume of a refrigerant gas precipitated from the lubricating oil by changing the predetermined pressure reduction rate when the determination unit determines that the foaming is not permissible, and
wherein the pressure reduction rate identification unit is configured to identify the predetermined pressure reduction rate, in which the determination unit determines that the foaming is permissible, as the pressure reduction rate at which foaming does not occur.

2. The refrigeration machine control device according to claim 1, further comprising a chilled water outlet temperature setting unit which is configured to calculate an amount of decrease in an evaporation temperature according to the identified pressure reduction rate and sets a value obtained by subtracting the amount of decrease in the evaporation temperature from a set chilled water outlet temperature, which is a current target value of a temperature of the chilled water outlet, as a new set chilled water outlet temperature,
wherein the pressure adjustment unit is configured to adjust the pressure of the evaporator so that a measured value of the temperature of the chilled water outlet matches a set chilled water outlet temperature set by the chilled water outlet temperature setting unit.

3. A turbo refrigeration machine comprising:
a turbo compressor which is configured to compress a refrigerant gas;
a condenser which is configured to condense the refrigerant gas compressed by the turbo compressor;
an expansion valve which is configured to expand a liquid refrigerant guided from the condenser;
an evaporator which is configured to lower a temperature of chilled water flowing in from a chilled water inlet by evaporating the liquid refrigerant expanded by the expansion valve and then cause the chilled water to flow out from a chilled water outlet;
an oil tank which stores lubricating oil to be supplied to the turbo compressor;
a pressure equalizing pipe which connects the oil tank to the evaporator; and
a refrigeration machine control device which is configured to control each of the parts,
wherein the refrigeration machine control device includes:
a processor configured to perform the functions of:
a pressure reduction rate identification unit which is configured to identify a pressure reduction rate at which foaming does not occur in the oil tank, and
a pressure adjustment unit which is configured to adjust a pressure of the evaporator on the basis of the identified pressure reduction rate;
wherein the pressure reduction rate identification unit includes:
a refrigerant precipitation gas volume calculation unit which is configured to calculate a volume of a refrigerant gas precipitated from the lubricating oil when the pressure is reduced at a predetermined pressure reduction rate; and
a determination unit which is configured to determine whether or not the foaming is permissible on the basis of a comparison between the calculated volume and a volume on a surface of an oil in the oil tank,
wherein the refrigerant precipitation gas volume calculation unit is configured to calculate the volume of a refrigerant gas precipitated from the lubricating oil by changing the predetermined pressure reduction rate when the determination unit determines that the foaming is not permissible, and wherein the pressure reduction rate identification unit is configured to identify the predetermined pressure reduction rate, in which the determination unit determines that the foaming is permissible, as the pressure reduction rate at which foaming does not occur.

4. A refrigeration machine control method in which a turbo refrigeration machine including a turbo compressor which is configured to compress a refrigerant gas, a condenser which is configured to condense the refrigerant gas compressed by the turbo compressor by radiating heat through heat exchange, an expansion valve which is configured to expand a liquid refrigerant guided from the condenser, an evaporator which is configured to lower a temperature of chilled water flowing in from a chilled water inlet by causing the liquid refrigerant expanded by the expansion valve to absorb heat and to evaporate due to the heat exchange and then cause the chilled water to flow out from a chilled water outlet, an oil tank which stores lubricating oil to be supplied to the turbo compressor, and a pressure equalizing pipe which connects the oil tank to the evaporator is controlled by a refrigeration machine control device, wherein the refrigeration machine control device includes a processor configured to perform the functions of:

a pressure reduction rate identification unit which is configured to identify a pressure reduction rate at which foaming does not occur in the oil tank, and a pressure adjustment unit which is configured to adjust a pressure of the evaporator on the basis of the identified pressure reduction rate, wherein the pressure reduction rate identification unit includes a refrigerant precipitation gas volume calculation unit and a determination unit, wherein a volume of a refrigerant gas precipitated from the lubricating oil is calculated by the refrigerant precipitation gas volume calculation unit when the pressure is reduced at a predetermined pressure reduction rate, wherein whether or not the foaming is permissible is determined by the determination unit on the basis of a comparison between the calculated volume and a volume on a surface of an oil in the oil tank, wherein the refrigerant precipitation gas volume calculation unit is configured to calculate the volume of a refrigerant gas precipitated from the lubricating oil by changing the predetermined pressure reduction rate when the determination unit determines that the foaming is not permissible, and wherein the pressure reduction rate identification unit is configured to identify the predetermined pressure reduction rate, in which the determination unit determines that the foaming is permissible, as the pressure reduction rate at which foaming does not occur.

5. A non-transitory computer-readable recording medium that stores a program for controlling a turbo refrigeration machine by a refrigeration machine control device, the refrigeration machine control device including:

a pressure reduction rate identification unit which is configured to identify a pressure reduction rate at which foaming does not occur in an oil tank, and a pressure adjustment unit which is configured to adjust a pressure of an evaporator on the basis of the identified pressure reduction rate, wherein the pressure reduction rate identification unit includes a refrigerant precipitation gas volume calculation unit and a determination unit, the program being configured to perform the steps of:

calculating, by the refrigerant precipitation gas volume calculation unit, a volume of a refrigerant gas precipitated from the lubricating oil when the pressure is reduced at a predetermined pressure reduction rate, determining, by the determination unit, whether or not the foaming is permissible on the basis of a comparison between the calculated volume and a volume on a surface of an oil in the oil tank, calculating, by the refrigerant precipitation gas volume calculation unit the volume of a refrigerant gas precipitated from the lubricating oil by changing the predetermined pressure reduction rate when the determination unit determines that the foaming is not permissible, and identifying, by the pressure reduction rate identification unit, the predetermined pressure reduction rate, in which the determination unit determines that the foaming is permissible, as the pressure reduction rate at which foaming does not occur.

\* \* \* \* \*